June 13, 1961  B. S. HARRINGTON  2,987,922
SAMPLING TOOL
Filed July 29, 1957  2 Sheets-Sheet 2
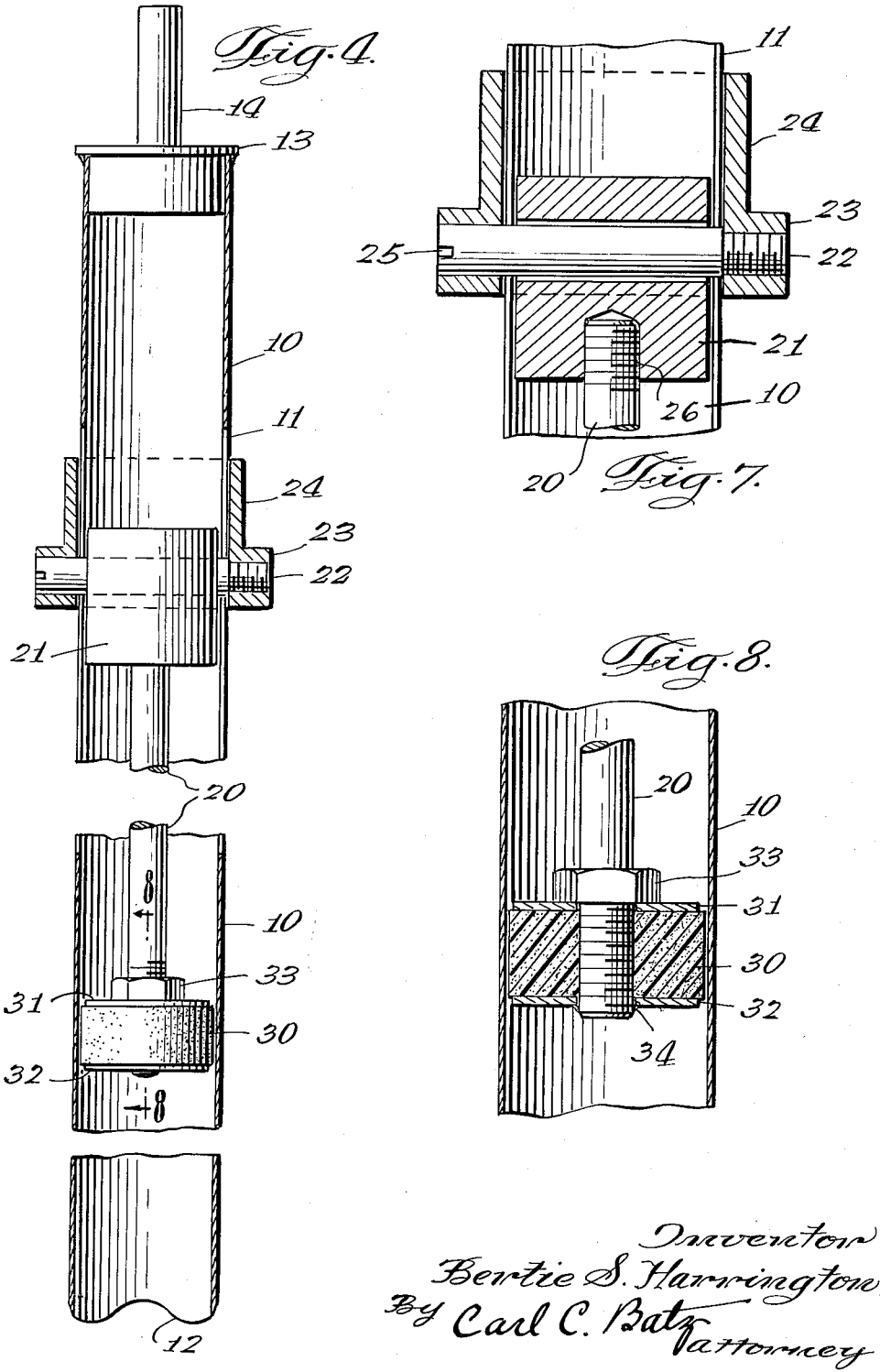
Inventor
Bertie S. Harrington
By Carl C. Batz
attorney 2,987,922
Patented June 13, 1961

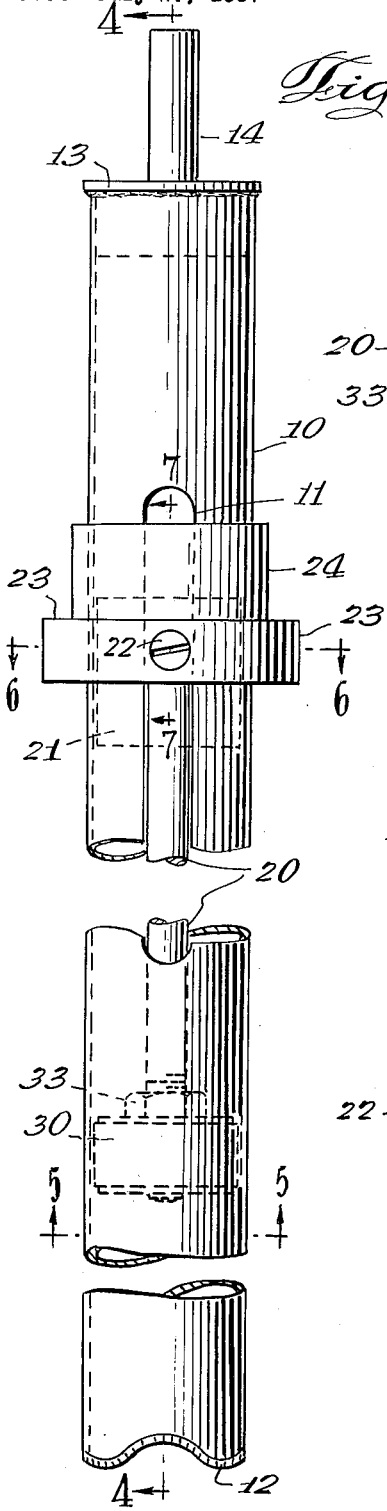
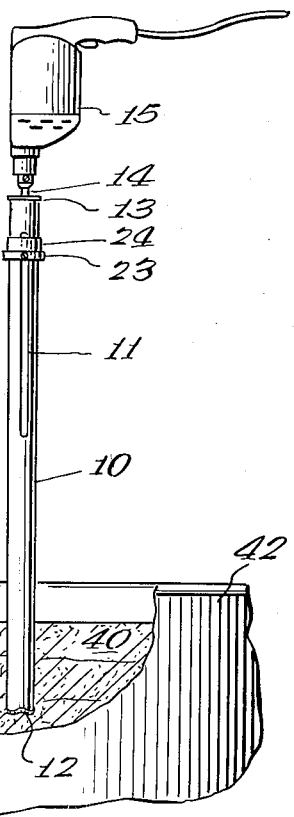
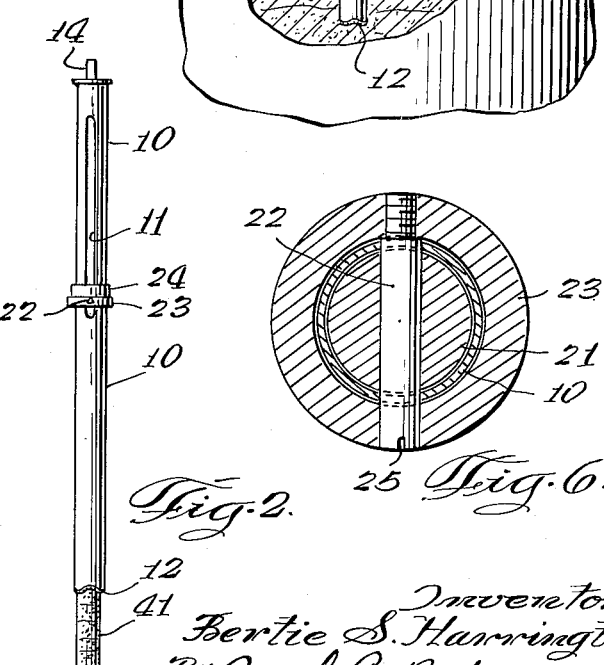

2,987,922
SAMPLING TOOL
Bertie S. Harrington, Chicago, Ill., assignor, by mesne assignments, to Armour & Company, Chicago, Ill., a corporation of Delaware
Filed July 29, 1957, Ser. No. 674,887
3 Claims. (Cl. 73—425)

This invention relates to a sampling tool. The invention is also related to a tool for sampling unground meat materials and particularly for sampling fresh, raw unground meats.

In the formulation of manufactured meat products such as sausage it is necessary to ascertain the proportions of fat and lean meat and moisture in the raw meat materials. In making such an analysis the most important step in the procedure is obtaining a representative sample. Highly accurate chemical analysis is valueless if the sampling techniques and instruments are inaccurate. A practical system of sampling meat must necessarily be very accurate, rapid, inexpensive and must require compartively little skill and equipment. The raw materials are ordinarily large tank truck loads of meat trimmings often containing approximately about 800 lbs. of meat. The sampling tool of this invention has been found to be useful in sampling truck loads of regular pork trimmings, beef chucks, regular beef trimmings, pork jowls, pork head meat, pork chucks, pork special lean trimmings and beef plates.

It is therefore an object of the present invention to provide a sampling tool which will enable representative samples to be taken from loads of unground raw meats. It is also an object to provide a tool which is easily and completely cleaned, thereby meeting the high sanitary requirements of a food processing industry. It is also an object to provide a tool which can be operated with readily obtainable power units such as pneumatic and electric tool motors. It is a particular object to provide a core sampling tool which will enable an unskilled operator to remove a representative core from a very yielding plastic fresh, raw meat supply present in truck load quantities. Further objects and advantages of the invention will appear as the specification proceeds.

The invention is illustrated by the accompanying drawings in which like reference numerals designate corresponding parts and all the various figures and in which FIG. 1 is a perspective view of the sampling tool in operating position utilizing an electric motor as a source of power. The tool is shown as used in taking a sample of meat from a large container filled with meat scraps.

FIG. 2 is a perspective view of the sampling tool with the ejector in depressed position thereby forcing a sample core of unground fresh meat from the tool.

FIG. 3 is an enlarged fragmentary view showing several details of the structure of the tool.

FIG. 4 is a fragmentary cross-sectional view taken on view line 4—4 of FIG. 3 showing the structure of the tool.

FIG. 5 is a sectional view taken on view line 5—5 of FIG. 3 showing an end view of the ejector assembly.

FIG. 6 is a cross-sectional view taken on view line 5—5 of FIG. 3 showing details of the structure of the upper part of the ejector assembly.

FIG. 7 is an enlarged fragmentary view taken on view line 7—7 of FIG. 3 also showing details of the structure of the upper portion of the ejector assembly.

FIG. 8 is an enlarged fragmentary cross-sectional view taken on view line 8—8 of FIG. 4 showing details of the structure of the lower portion of the ejector assembly.

The external appearance of the sampling tool is best shown in FIGS. 1 and 2, wherein (in FIG. 1) the tool is shown in use in the sampling of a load of unground meat materials. An electric motor is used as a source of rotary power. In FIG. 2 the tool is shown with the motor detached and with the ejector in the depressed position thus forcing out a sample core of meat. As shown in FIGS. 1 and 2, the sampling tool comprises a hollow cylindrical tube 10 which is provided in its upper portion with slots or elongated apertures 11 in the upper portion. The tube is provided also with an undulate knife edge (FIG. 3) which is formed by sharpening the lower end of the side walls of the hollow cylindrical tube. As is shown in detail in FIGS. 3 and 4 and is shown also in FIGS. 1 and 2, the hollow tube 10 is provided in the upper portion with a plug 13 to which is attached a driving spindle or shaft 14 which is a means of imparting a rotary movement to the hollow cylindrical tube by an external source of power such as a pneumatic or by an electric motor 15, as is shown in FIG. 1.

The ejector assembly comprises a plunger or piston-like apparatus which is operated by hand by means of annular ring 23 connected to the ejector by means of a pin 22 which penetrates from the annular ring 23, which is on the external surface of the tube 10, through the elongated apertures 11 into a guide block 21 and out again through an aperture into the annular ring. As shown in FIGS. 3, 4 and 6 the pin 22 may be provided with a small slot 25 which may facilitate insertion of the pin 22 by means of a screw driver or similar tool. The annular ring 23, which serves as a handle for the ejectors assembly, is also provided in the upper portion thereof with a collar 24 which lends an added degree of rigidity to the handle assembly. As shown in FIG. 7, an ejector rod 20 is attached by any suitable means such as the threads 26 to the lower part of the guide block 21 within the hollow cylindrical tube 10 of the tool. The ejector rod 20 is provided on its lower end with an ejector plug head 30 which is fastened to the rod 20 by any suitable means such as the lower washer 32 which is welded at seam 34 to the lower end of the ejector rod 20. The ejector plug head 30 rests upon lower washer 32 and is held against the washer 32 by means of an upper washer 31 and the nut 33 which is adjustably attached to rod 20 by means of threads. This structure is also shown in an end view in FIG. 5 and in cross-section FIGS. 4 and 8.

In the use of the tool in obtaining a representative sample of meat from a truck 42 containing raw unground meat 40 as is shown in FIG. 1, the undulating knife edge 12 of the tool is placed upon the surface of the meat at the point where the sample is to be taken. Rotary power is then applied to the tube by any suitable means such as the electric motor 15 attached to the hollow cylindrical tube 10 by means of a shaft 14 which is rigidly fixed to the tube at the upper portion thereof. The entire tube is thereby rotated and the undulating knife edge 12 cuts its way into the meat without pushing or tearing, thus taking a clean-cut core of all the materials lying in its path. As the tool cuts its way into the meat a sample is built up within the lower portion of the tube 10 and the ejector plug head assembly rides upward upon such core of meat until the pin 22 comes to the upper end of the elongated slot 11. When this amount of sample is obtained (or any lesser amount), the tool is removed from the raw material and, as shown in FIG. 2, the ejector assembly is operated by manually sliding the ring 23 and 24 downwards thereby moving the plunger head 30 downward to expel the sample of meat 41. The downward stroke of the ejector is of course limited by the elongated aperture 11 which limits the stroke of the plunger when the pin 22 reaches the lower point of the aperture.

It will be apparent that many modifications of the tool of this invention may be named by those skilled in the art and it will be understood that all such modifications and variations are within the scope of the invention and the following claims.

I claim:

1. A sampling tool comprising a hollow cylindrical tube of substantially uniform diameter, said tube having longitudinally positioned opposed elongated apertures about 180° apart in the upper portion thereof; an undulate knife edge at one end of said hollow cylindrical tube, said undulate knife edge being formed from the walls of said hollow cylindrical tube and defining an opening therethrough of substantially the same diameter as the inner diameter of said tube; a shank fixed at the end of said hollow cylindrical tube opposite said undulate knife edge whereby a rotary movement may be imparted to said hollow cylindrical tube by an external source of power; an annular ring about said hollow cylindrical tube, said annular ring being adapted to be grasped to be manually moved along the longtudinal axis of said hollow cylindrical tube; a guide block within said hollow cylindrical tube; a guide block pin passing through the apertures of said hollow cylindrical tube and connecting said guide block and said annular ring; an ejector rod within said hollow cylindrical tube mounted in said guide block, said ejector rod being substantially parallel to the longitudinal axis of said hollow cylindrical tube; and an ejector plug mounted on the end of said ejector rod opposite said guide block; said annular ring, said guide block, said guide block pin, said ejector rod and said ejector plug forming an ejector assembly which is freely slidable within said hollow cylindrical tube to accommodate a sample core within the tube as such sample is being taken and which is operable by hand to remove sample cores from said hollow cylindrical tube.

2. A sampling tool comprising a hollow cylindrical tube of substantially uniform diameter having an elongated narrow aperture in a side thereof and having an undulate knife edge at one end thereof formed from the side walls thereof; said knife edge defining an opening of substantially the same diameter as said tube; means for rotating said hollow cylindrical tube about its longitudinal axis; a sample ejector means slidably mounted for movement between extended and retracted positions within said hollow cylindrical tube and being slidable into retracted position by a sample being received within said tube; and a handle means connected to said sample ejector means projecting radially from said sample ejector means through said elongated aperture in said hollow cylindrical tube whereby said sample ejector means may be urged by hand into its extended position.

3. A sampling tool for sampling unground meat comprising a hollow cylindrical tube of substantially uniform diameter, said tube having an elongated aperture in the upper portion thereof; an undulate knife edge formed from the side walls of said hollow cylindrical tube at the end thereof opposite the end having said elongated aperture; said knife edge defining an opening of substantially the same diameter as said tube means for applying rotative power to said hollow cylindrical tube, said means being mounted proximate to the end of said hollow cylindrical tube opposite said undulate knife edge; means for ejecting samples from said hollow cylindrical tube, said means being freely slidably mounted for movement between extended and retracted positions within said hollow cylindrical tube; a pin passing through said hollow cylindrical tube through said elongated aperture, said pin being fixed to said means for ejecting meat and being adapted for the attachment of a handle whereby said means for ejecting meat may be manually operated.

References Cited in the file of this patent

UNITED STATES PATENTS

| | | |
|---|---|---|
| 809,419 | Belchior | Jan. 9, 1906 |
| 1,188,980 | Murrell | June 27, 1916 |
| 1,269,922 | Gadecki | June 18, 1918 |
| 2,250,758 | French | July 29, 1941 |
| 2,346,220 | Kienzle et al. | Apr. 11, 1944 |
| 2,492,158 | Le Compte et al. | Dec. 27, 1949 |
| 2,558,998 | Yearout | July 3, 1951 |
| 2,666,330 | McAndrew | Jan. 19, 1954 |